United States Patent
Cheng

(10) Patent No.: US 7,580,301 B2
(45) Date of Patent: Aug. 25, 2009

(54) METHOD CONTROL CIRCUIT PERFORMING ADJUSTABLE DATA DELAY OPERATION BASED UPON PHASE DIFFERENCE BETWEEN DATA STROBE SIGNAL AND CLOCK SIGNAL, AND ASSOCIATED METHOD

(75) Inventor: Wen-Chang Cheng, Tao-Yuan (TW)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 374 days.

(21) Appl. No.: 11/618,937

(22) Filed: Jan. 2, 2007

(65) Prior Publication Data

US 2008/0056029 A1    Mar. 6, 2008

(30) Foreign Application Priority Data

Sep. 6, 2006    (TW) .............................. 95132912 A

(51) Int. Cl.
G11C 7/00    (2006.01)
(52) U.S. Cl. .................. 365/194; 365/189.16; 365/193; 365/233.13; 365/233.16
(58) Field of Classification Search .......... 365/189.011, 365/189.16 X, 189.05, 191, 193 X, 194 X, 365/233.1, 233.13 X, 233.16 X, 189.16, 193, 365/194, 233.13, 233.16
See application file for complete search history.

(56) References Cited

U.S. PATENT DOCUMENTS

| | | | | |
|---|---|---|---|---|
| 6,707,723 B2 * | 3/2004 | Jeong | .................... | 365/189.05 |
| 7,042,799 B2 * | 5/2006 | Cho | ...................... | 365/185.17 |
| 7,123,524 B1 * | 10/2006 | Han | .......................... | 365/193 |
| 7,209,396 B2 * | 4/2007 | Schnell | ....................... | 365/193 |
| 7,457,190 B2 * | 11/2008 | Lee, Geun II | .......... | 365/233.16 |

* cited by examiner

*Primary Examiner*—VanThu Nguyen
(74) *Attorney, Agent, or Firm*—Winston Hsu

(57) ABSTRACT

A memory control circuit includes: a phase detection module for detecting a phase difference between a data strobe signal and a clock signal; a control module, coupled to the phase detection module, for generating a set of control signals according to the phase difference, where the set of control signals correspond to the phase difference; a latch module for latching write data carried by a data signal according to rising/falling edges of the data strobe signal; an odd/even data separator, coupled to the latch module, for performing odd/even data separation on the write data to generate a data separation signal carrying odd/even data corresponding to the write data; and an adjustable delay line module, coupled to the odd/even data separator and the control module, for adjusting the odd/even data's delay according to the control signals, where the delay amount of the odd/even data corresponds to the control signals.

19 Claims, 3 Drawing Sheets

METHOD CONTROL CIRCUIT PERFORMING ADJUSTABLE DATA DELAY OPERATION BASED UPON PHASE DIFFERENCE BETWEEN DATA STROBE SIGNAL AND CLOCK SIGNAL, AND ASSOCIATED METHOD

BACKGROUND OF THE INVENTION

1. Field of the Invention

The present invention relates to random access memory (RAM) control, and more particularly, to memory control circuits and methods.

2. Description of the Prior Art

As information technology industries develop, semiconductor component technologies progress rapidly. In order to increase the writing or reading speed of random access memories (RAMs), double data rate (DDR) technology is introduced for related applications, where RAMs utilizing DDR technology can be referred to as DDR RAMs.

The data accessing of conventional RAMs corresponds to a specific edge of each of a plurality of periods of a clock signal. For example, the specific edge is a rising edge. As the data accessing of DDR RAMs corresponds to the rising and falling edges of each of a plurality of periods of a clock signal, the data accessing speed of DDR RAMs is twice as fast as the data accessing speed of conventional RAMs if their clock signals have the same frequency.

A data strobe signal differing from a clock signal can be applied to DDR RAMs for data accessing, where the data strobe signal mentioned above is also referred to as the DQS signal, and the signal format thereof is well known in the art. As shown in FIG. 1, when a write command WR is outputted, a plurality of periodic pulses should occur in the data strobe signal DQS after the data strobe signal DQS enters a low level. The rising and falling edges of these periodic pulses can be utilized as time references for writing data D0, D1, D2, D3, etc. carried by the data signal DQ into memory cells of a memory. In addition, within the waveform of the data strobe signal DQS shown in FIG. 1, the portion corresponding to the low level occurring before the periodic pulses' appearance is referred to as the preamble. Additionally, the time interval between a rising edge of the clock signal VCLK around the time point when the write command WR is issued and the first rising edge of the data strobe signal DQS around the end of the preamble is defined as $T_{DQSS}$.

In some situations, for example, a situation where the frequency of the clock signal VCLK is increased and the signal delay of some portions within a circuit system is not properly corrected, the data strobe signal DQS may not comply with a particular specification. Once the time interval $T_{DQSS}$ does not comply with the range defined by the specific specification mentioned above, the data carried by the data signal DQ cannot be guaranteed to be written into memory cells correctly.

SUMMARY OF THE INVENTION

It is therefore an objective of the claimed invention to provide memory control circuits and methods to solve the above-mentioned problem.

According to one embodiment of the claimed invention, a memory control circuit is disclosed. The memory control circuit comprises: a phase detection module, for detecting a phase difference between a data strobe signal and a clock signal; a control module, coupled to the phase detection module, for generating a set of control signals according to the phase difference, where the set of control signals correspond to the phase difference; a latch module for latching write data carried by a data signal according to rising/falling edges of the data strobe signal; an odd/even data separator, coupled to the latch module, for performing odd/even data separation on the write data to generate a data separation signal carrying odd/even data corresponding to the write data; and an adjustable delay line module, coupled to the odd/even data separator and the control module, for adjusting the delay of the odd/even data carried by the data separation signal according to the set of control signals, where the delay amount of the odd/even data corresponds to the set of control signals.

According to one embodiment of the claimed invention, a memory control method is disclosed. The memory control method comprises: generating a set of control signals according to the phase difference, where the set of control signals correspond to the phase difference; latching write data carried by a data signal according to rising/falling edges of the data strobe signal; performing odd/even data separation on the write data to generate a data separation signal carrying odd/even data corresponding to the write data; and adjusting the delay of the odd/even data carried by the data separation signal according to the set of control signals, where the delay amount of the odd/even data corresponds to the set of control signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
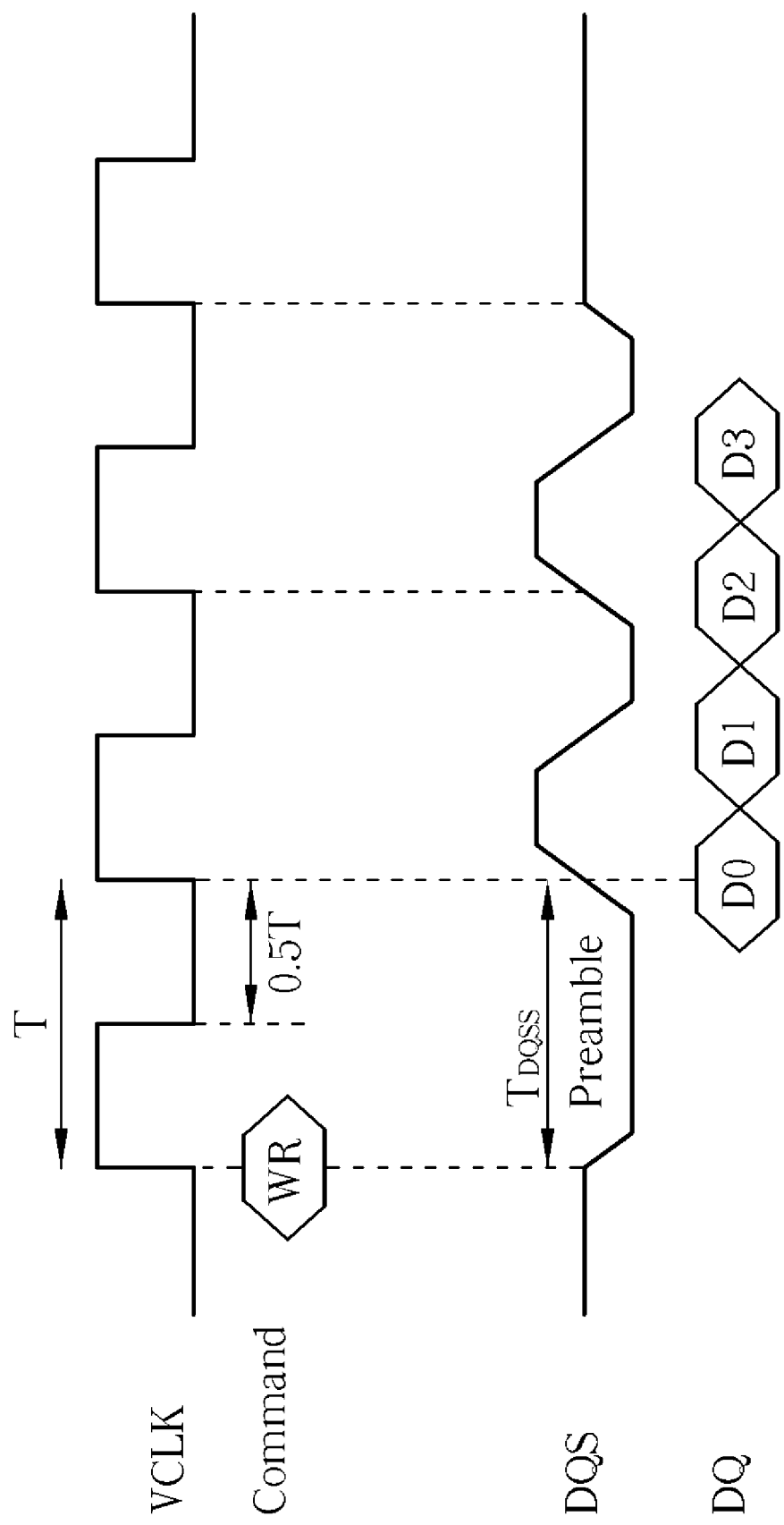
FIG. 1 is a diagram of a data strobe signal and a data signal according to the prior art.
Figure 2:
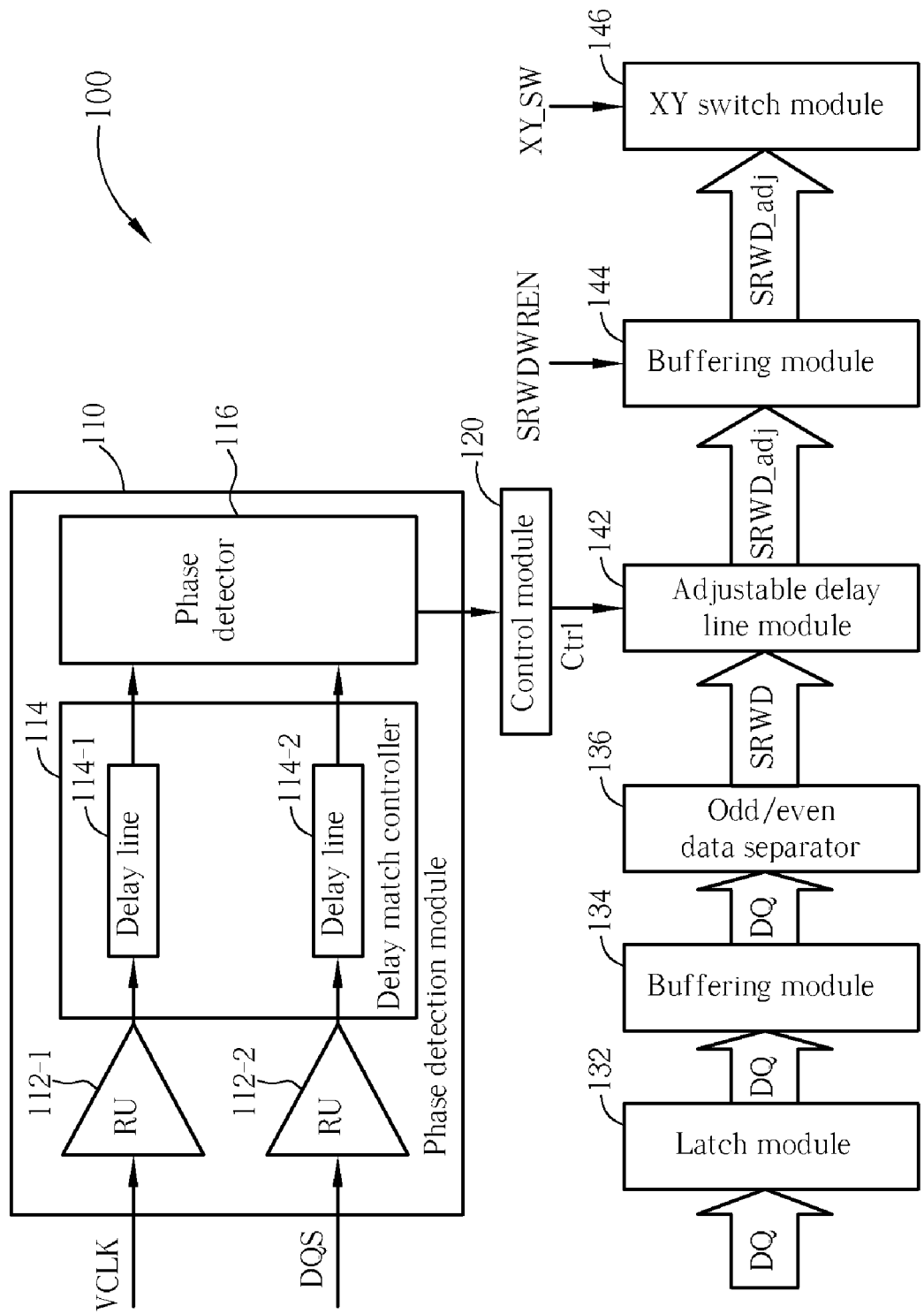
FIG. 2 is a diagram of a memory control circuit according to one embodiment of the present invention.

Please refer to FIG. 2. FIG. 2 is a diagram of a memory control circuit 100 according to a preferred embodiment of the present invention, where the memory control circuit 100 comprises a phase detection module 110, a control module 120, a latch module 132, a buffering module 134, an odd/even data separator 136, an adjustable delay line module 142, a buffering module 144, and a switch module, where the switch module in this embodiment is the XY switch module 146. As shown in FIG. 2, the phase detection module 110 comprises two receiving units 112-1 and 112-2, a delay match controller 114, and a phase detector 116, where the delay match controller 114 comprises at least one delay line. In this embodiment, the delay match controller 114 comprises delay lines 114-1 and 114-2, and each delay line comprises a plurality of delay units (not shown).

The phase detection module 110 is capable of detecting a phase difference between the data strobe signal DQS and the clock signal VCLK mentioned above. Within the phase detection module 110 shown in FIG. 2, the two receiving units 112-1 and 112-2 respectively receive the clock signal VCLK and the data strobe signal DQS, and the delay match controller 114 is capable of controlling delay lines 114-1 and 114-2 to respectively delay the clock signal VCLK and the data strobe signal DQS. Through the control by the delay match controller 114, the delay amount between the clock signal VCLK and the data strobe signal DQS can be properly controlled to lie within a specific range. Thus, the clock signal VCLK and the data strobe signal DQS output by the delay match controller 114 after the delay match control thereof is performed can be utilized by the phase detector 116 for further detection. As a result, the phase detector 116 detects the phase difference according to the clock signal VCLK and the data strobe signal DQS output by the delay match controller 114.

In addition, the control module 120 generates a set of control signals Ctrl according to the phase difference, where the set of control signals Ctrl correspond to the phase difference. According to this embodiment, the control module 120 is a decoder, and is capable of performing decoding according to the phase difference to generate the set of control signals Ctrl. Additionally, the latch module 132 is capable of latching the write data carried by the data signal DQ according to the rising/falling edges of the data strobe signal DQS, for further buffering by the buffering module 134. As a result, the odd/even data separator 136 performs odd/even data separation on the buffered write data to generate a data separation signal SRWD, where the data separation signal SRWD carries the odd/even data corresponding to the write data.

According to this embodiment, the adjustable delay line module 142 adjusts the delay of the odd/even data carried by the data separation signal SRWD according to the set of control signals Ctrl, where the delay amount of the odd/even data corresponds to the set of control signals Ctrl. As mentioned above, the set of control signals Ctrl correspond to the phase difference, so the delay amount of the odd/even data also corresponds to the phase difference. Through the adjustable delay control architecture as mentioned above, the adjustable delay line module 142 outputs the delay-adjusted data separation signal SRWD_adj, where the delay-adjusted data separation signal SRWD_adj corresponds to the data separation signal SRWD, and carries the delayed odd/even data. As a result, the delay-adjusted data separation signal SRWD_adj is input into the buffering module 144 for further buffering processing.

As shown in FIG. 2, the buffering module 144 performs buffering control on the delayed odd/even data according to the odd/even data write enabling signal SRWDWREN. When the odd/even data write enabling signal SRWDWREN is at an enabling state, the buffering module 144 may output the delayed odd/even data to the XY switch module 146. As a result, the XY switch module 146 may output the delayed odd/even data according to the selection signal XY_SW, for further writing into memory cells of a memory. The odd/even data write enabling signal SRWDWREN and the selection signal XY_SW mentioned above are well known in the art, and therefore not explained in detail here.

Figure 3:
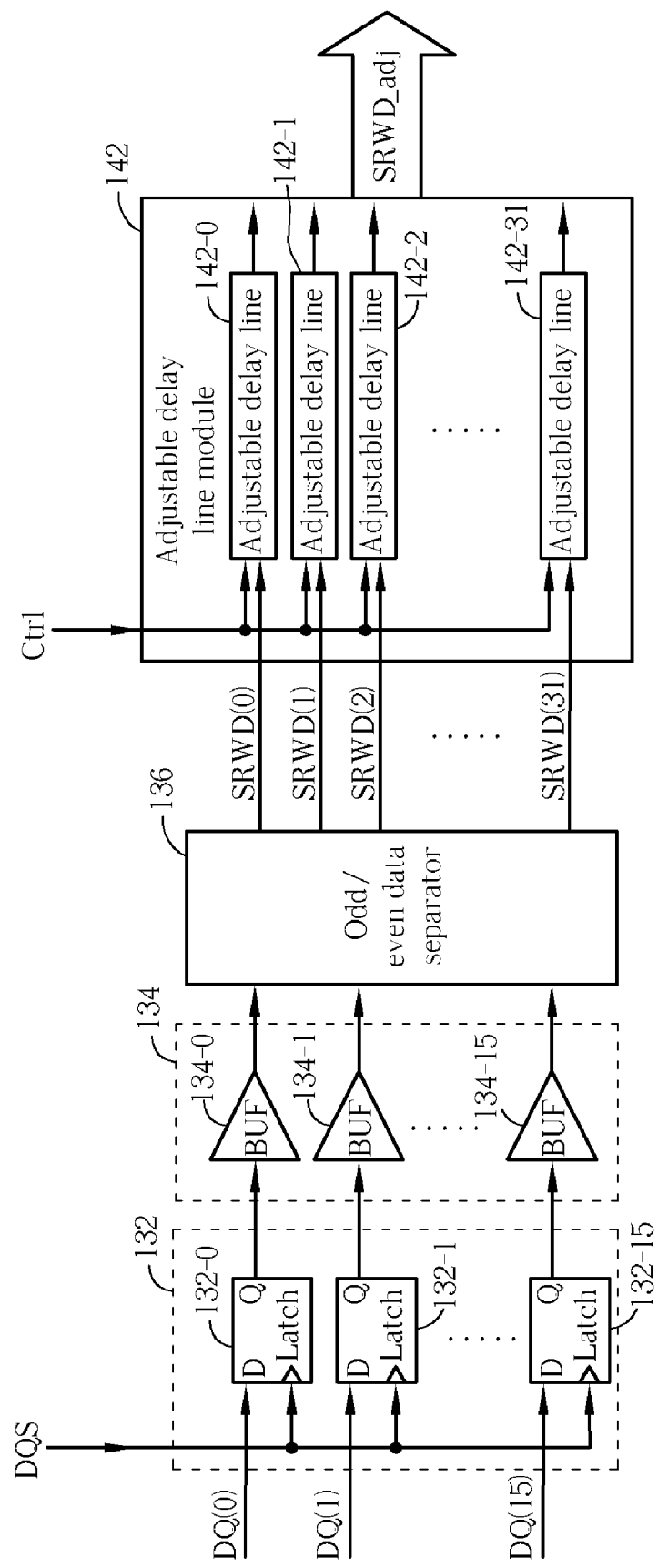
FIG. 3 illustrates implementation details of a portion of components shown in FIG. 2.

According to this embodiment, implementation details of a portion of components shown in FIG. 2 are illustrated as shown in FIG. 3. The latch module 132 comprises a plurality of latches 132-0, 132-1, . . . , and 132-15, respectively corresponding to a plurality of bits DQ(0), DQ(1), . . . , and DQ(15) of the data signal DQ, where each latch 132-i (i=0, 1, . . . , 15) latches a bit DQ(i) of the data signal DQ according to the data strobe signal DQS. The bits DQ(0), DQ(1), . . . , and DQ(15) of the data signal DQ latched by the latches 132-0, 132-1, . . . , and 132-15 are outputted to the odd/even data separator 136 respectively through the corresponding buffers 134-0, 134-1, . . . , and 134-15 in the buffering module 134, for performing odd/even data separation. The data separation signal SRWD generated after performing the odd/even data separation includes a plurality of bits SRWD(0), SRWD(1), . . . , and SRWD(31).

As shown in FIG. 3, the adjustable delay line module 142 comprises a plurality of adjustable delay lines 142-0, 142-1, . . . , and 142-31, respectively corresponding to the plurality of bits SRWD(0), SRWD(1), . . . , and SRWD(31) of the data separation signal SRWD, where each adjustable delay line 142-j (j=0, 1, . . . , 31) comprises a plurality of delay units (not shown). According to this embodiment, each adjustable delay line 142-j selects an output of a delay unit corresponding to the set of control signals Ctrl within the plurality of delay units thereof, in order to apply the delay amount corresponding to the set of control signals Ctrl to a bit SRWD(j) of the data separation signal SRWD to generate the corresponding bit SRWD_adj(j) within the delay-adjusted data separation signal SRWD_adj.

The present invention can therefore solve the prior art problem where data carried by the data signal DQ is not guaranteed to be written into memory cells correctly when the time interval $T_{DQSS}$ in the data strobe signal DQS does not comply with the specific specification.

By utilizing the phase difference detection architecture and the adjustable delay control on the data separation signal SRWD according to some embodiments of the present invention, no matter whether the data strobe signal DQS is at a lead status or a lag status, the memory control circuits and methods may adjust the data separation signal SRWD correspondingly to maintain the appearances of the odd/even data carried by the delay-adjusted data separation signal SRWD_adj within substantially the same time interval. That is, according to these embodiments, the present invention may keep the size of the data separation signal window (which can be referred to as the SRWD window) of the delay-adjusted data separation signal SRWD_adj independent of the lead or lag statuses of the data strobe signal DQS. Therefore, the odd/even data carried by the delay-adjusted data separation signal SRWD_adj can be written normally into memory cells of the memory through the buffering module 144 and the XY switch module 146.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory control circuit, comprising:
    a phase detection module, for detecting a phase difference between a data strobe signal and a clock signal;
    a control module, coupled to the phase detection module, for generating a set of control signals correspond to the phase difference, wherein the set of control signals correspond to the phase difference;
    a latch module, for latching write data carried by a data signal according to rising/falling edges of the data strobe signal;
    an odd/even data separator, coupled to the latch module, for performing odd/even data separation on the write data to generate a data separation signal carrying odd/even data corresponding to the write data; and
    an adjustable delay line module, coupled to the odd/even data separator and the control module, for adjusting the delay of the odd/even data carried by the data separation signal according to the set of control signals, wherein the delay amount of the odd/even data corresponds to the set of control signals.

2. The memory control circuit of claim 1, wherein the data signal is a DQ signal, and the data strobe signal is a DQS signal.

3. The memory control circuit of claim 1, wherein the phase detection module comprises:
   two receiving units, for respectively receiving the clock signal and the data strobe signal; and
   a phase detector, coupled to the two receiving units, for detecting the phase difference.

4. The memory control circuit of claim 3, wherein the phase detection module further comprises:
   a delay match controller, coupled to at least one receiving unit of the two receiving units, the delay match controller comprising at least one delay line for delaying the clock signal and/or the data strobe signal;
   where the phase detector detects the phase difference according to the delayed clock signal and/or the delayed data strobe signal obtained by utilizing the at least one delay line.

5. The memory control circuit of claim 1, wherein the control module is a decoder for performing decoding according to the phase difference to generate the set of control signals.

6. The memory control circuit of claim 1, wherein the latch module comprises a plurality of latches respectively corresponding to a plurality of bits of the data signal.

7. The memory control circuit of claim 1, wherein the adjustable delay line module comprises a plurality of adjustable delay lines respectively corresponding to a plurality of bits of the data separation signal, and each adjustable delay line applies the delay amount corresponding to the set of control signals to a bit of the data separation signal.

8. The memory control circuit of claim 7, wherein each adjustable delay line within the adjustable delay line module comprises a plurality of delay units.

9. The memory control circuit of claim 1, further comprising:
   a buffering module, coupled to the adjustable delay line module, for performing buffering control on the delayed odd/even data.

10. The memory control circuit of claim 9, further comprising:
    a switch module, coupled to the buffering module, for outputting the delayed odd/even data according to at least one selection signal.

11. A memory control method, comprising:
    detecting a phase difference between a data strobe signal and a clock signal;
    generating a set of control signals according to the phase difference, wherein the set of control signals correspond to the phase difference;
    latching write data carried by a data signal according to rising/falling edges of the data strobe signal;
    performing odd/even data separation on the write data to generate a data separation signal carrying odd/even data corresponding to the write data; and
    adjusting the delay of the odd/even data carried by the data separation signal according to the set of control signals, wherein the delay amount of the odd/even data corresponds to the set of control signals.

12. The memory control method of claim 11, wherein the data signal is a DQ signal, and the data strobe signal is a DQS signal.

13. The memory control method of claim 11, wherein the step of detecting the phase difference between the data strobe signal and the clock signal further comprises:
    respectively receiving the clock signal and the data strobe signal;
    utilizing at least one delay line to delay the clock signal and/or the data strobe signal; and
    detecting the phase difference according to the delayed clock signal and/or the delayed data strobe signal obtained by utilizing the at least one delay line.

14. The memory control method of claim 11, wherein the step of generating the set of control signals according to the phase difference further comprises:
    performing decoding according to the phase difference to generate the set of control signals.

15. The memory control method of claim 11, wherein the step of latching the write data carried by the data signal according to the rising/falling edges of the data strobe signal further comprises:
    utilizing a plurality of latches to latch the write data carried by the data signal, wherein the plurality of latches respectively correspond to a plurality of bits of the data signal.

16. The memory control method of claim 11, wherein the step of adjusting the delay of the odd/even data carried by the data separation signal according to the set of control signals further comprises:
    utilizing a plurality of adjustable delay lines to adjust the delay of the odd/even data carried by the data separation signal, wherein the plurality of adjustable delay lines respectively correspond to a plurality of bits of the data separation signal, and each adjustable delay line applies the delay amount corresponding to the set of control signals to a bit of the data separation signal.

17. The memory control method of claim 16, wherein each adjustable delay line comprises a plurality of delay units.

18. The memory control method of claim 11, further comprising:
    performing buffering control on the delayed odd/even data.

19. The memory control method of claim 18, further comprising:
    utilizing a switch module to output the delayed odd/even data according to at least one selection signal.

* * * * *

UNITED STATES PATENT AND TRADEMARK OFFICE
CERTIFICATE OF CORRECTION

PATENT NO. : 7,580,301 B2
APPLICATION NO. : 11/618937
DATED : August 25, 2009
INVENTOR(S) : Wen-Chang Cheng It is certified that error appears in the above-identified patent and that said Letters Patent is hereby corrected as shown below:

On the title page, item (54) and Column 1, lines 1-6, correct the invention title from "METHOD CONTROL CIRCUIT PERFORMING ADJUSTABLE DATA DELAY OPERATION BASED UPON PHASE DIFFERENCE BETWEEN DATA STROBE SIGNAL AND CLOCK SIGNAL, AND ASSOCIATED METHOD" to "MEMORY CONTROL CIRCUIT PERFORMING ADJUSTABLE DATA DELAY OPERATION BASED UPON PHASE DIFFERENCE BETWEEN DATA STROBE SIGNAL AND CLOCK SIGNAL, AND ASSOCIATED METHOD".

Signed and Sealed this

Twenty-seventh Day of October, 2009

David J. Kappos
*Director of the United States Patent and Trademark Office*